UNITED STATES PATENT OFFICE.

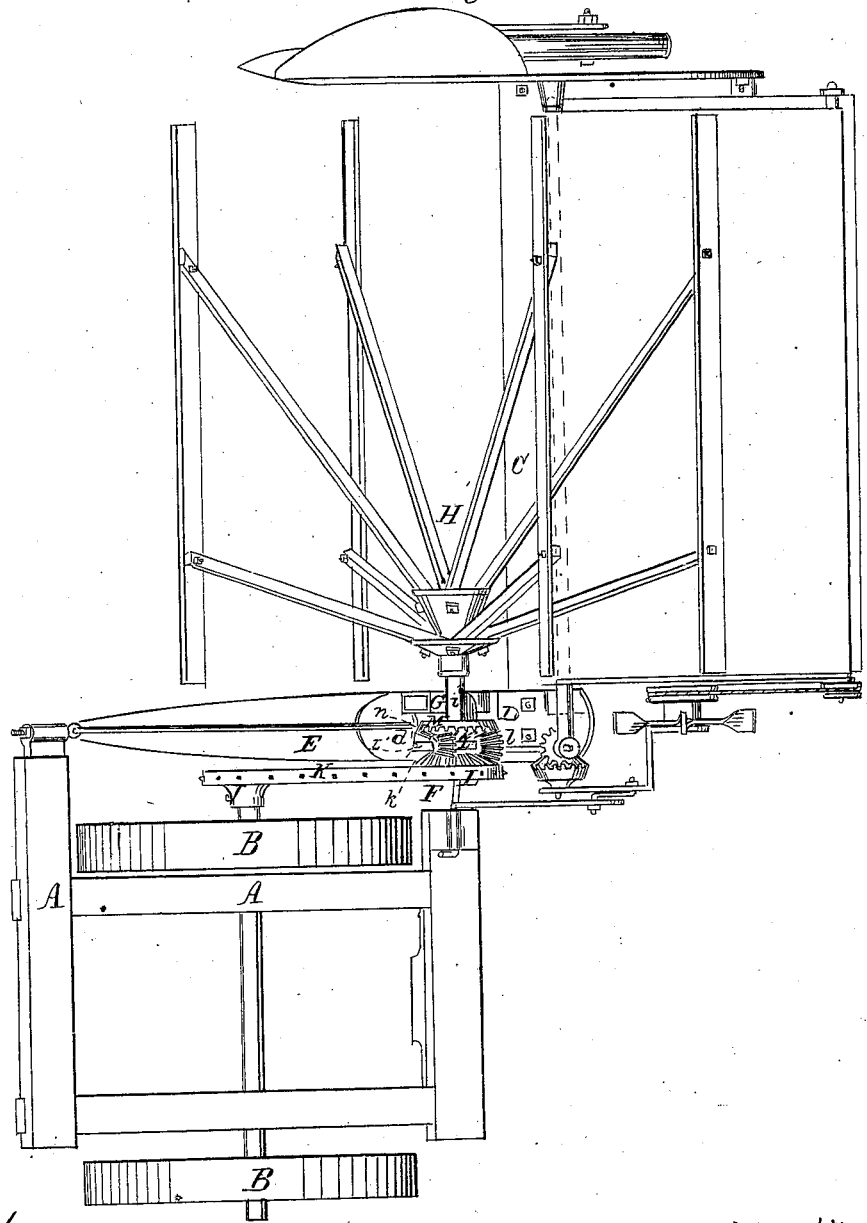

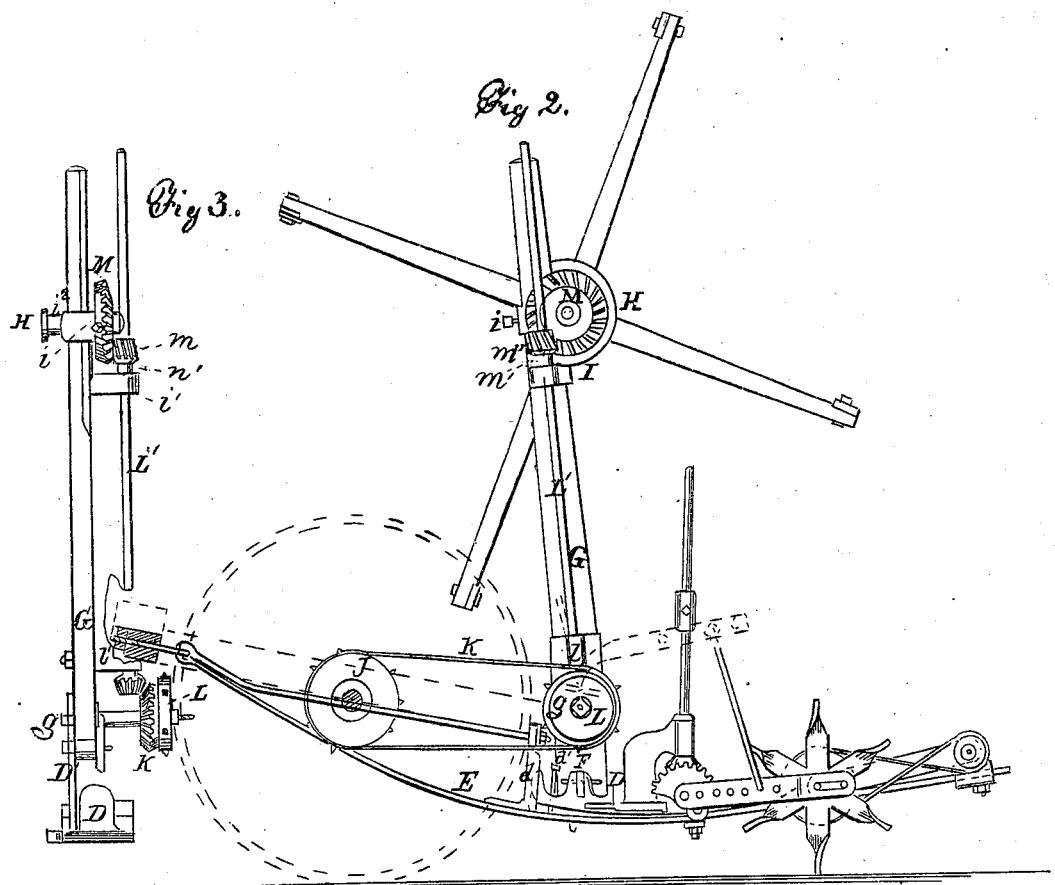

AMOS RANK AND JOSHUA H. COX, OF SALEM, OHIO.

IMPROVEMENT IN HARVESTERS.

Specification forming part of Letters Patent No. 82,987, dated October 13, 1868.

*To all whom it may concern:*

Be it known that we, AMOS RANK and JOSHUA H. COX, both of Salem, in the county of Columbiana and State of Ohio, have invented certain new and useful Improvements in Harvesters, of which the following is a full, clear, and exact description.

Our invention more especially relates to that class of machines known as "two-wheeled hinge-joint harvesters." In this class of machines the reel is usually driven by a belt or chain passing over a pulley on the reel-shaft and a corresponding pulley on the main axle; and, as the distance between these two points is constantly varying, (owing to the constant rising and falling of the finger-beam to conform to the undulations of the surface of the ground,) much annoyance is occasioned by the breaking or slackening of the reel-belt.

The object of our invention is so to combine a reel with a two-wheeled hinge-joint harvester as to drive the reel steadily by means of gearing, while leaving it free to be adjusted backward or forward, or up and down, as required; to which end the improvements herein claimed consist, first, in a novel method of combining, with a two-wheeled hinge-joint harvester, an overhung reel, adjustable vertically and mounted on the shoe, and a driving-shaft, mounted in bearings in the reel-support, driven by gearing, and provided with a pinion, sliding freely endwise on its shaft, to drive the reel and admit of its vertical adjustment; second, in a novel method of mounting the reel-shaft in a bracket or clasp embracing the reel-post, and also carrying the bearing for the pinion sliding on the shaft; third, in a novel method of driving the reel by means of gearing, the teeth of which are tangential to their axes.

In the accompanying drawings, Figure 1 represents a plan or top view of so much of a harvester embracing our improvements as is necessary to illustrate the invention. Fig. 2 represents a view, in elevation, of one side of the same. Fig. 3 represents a view, in elevation, of the reel supporting and driving mechanism, as seen from the front. Fig. 4 represents a front and side view of a modified form of the gearing which drives the reel. Fig. 5 represents a view, in elevation, of the shoe and standard, as seen from the divider side.

The main frame A is mounted on two wheels, B. The finger-beam C and shoe D are suspended from the main frame by the drag-bar E and coupling-arm F. The shoe D is pivoted at its rear end, to play vertically in its seat in the drag-bar, being guided by a bracket, $d$, on the front of the shoe, and held at any desired angle by a set-screw, $d'$. A standard, $D'$, is cast upon the grain side of this shoe, and has two slots in it. The reel-post is bolted on the stubble side of this standard by two bolts passing through the slots above mentioned. By mounting the reel-post on the shoe, it rocks when the guards are tipped, and thus preserves its relation to the cutting apparatus, which relation is fixed by the adjusting slots and bolts above mentioned. The upper bolt, $g$, in this instance is prolonged to form the support for a sprocket-pulley, L, (which is driven by a band, K, from a sprocket-wheel, J, on the main axle,) and also a bevel-wheel, $k$, which drives a corresponding pinion on the lower end of a shaft, $L'$. By this mode of construction, the driving-band K can be tightened or slackened, by setting the reel-post backward or forward on its standard by means of the slots, without disturbing the working of the gearing.

The lower end of the shaft $L'$ turns in a journal, $l'$, secured to the reel-post. The shaft is rounded at this point, so as to revolve freely, but not move endwise, in its bearings. The remainder of this shaft is made square or polygonal, in order that the pinion $m$, which drives the reel, may slide freely lengthwise of this shaft, and at the same time turn with it.

The pinion $m$ has an internal opening corresponding with the form of the shaft, and is provided with a circular collar or thimble, $m'$, which turns freely in a socket, $i^1$, in a bracket or clasp, I, which embraces and slides up and down on the reel-post, being held at any desired elevation by a pinch-screw, $i$.

An overhung reel, H, is mounted on a shaft, $h$, turning in pipe-bearings $i^2$ on the clasp I, and carrying a gear-wheel, M, on its opposite end. The teeth of this wheel, it will be observed, are cut tangentially to its axis, and not radially, as is usual. The teeth of the pinion $m$ are similarly formed. By this mode of construction, the teeth of the two wheels will mesh without having a common center. We can thus use a driving-shaft, L', which projects above the reel-shaft and lies close to the face of the wheel M. The gears M m, being both mounted in the same bracket, can be raised or lowered without affecting their working.

Our invention is intended to be used with a fully-organized harvester; but a detailed description of those parts is deemed unnecessary here, as they form no part of the invention herein claimed.

It is obvious that the details of construction of the gearing might be varied without departing from the spirit of my invention. For instance, instead of mounting the lower wheels on a stud on the reel-post, they might be mounted on a collar revolving on said stud.

Spur-gears might be used on the reel-shaft by placing a spur-pinion on a short shaft carrying a bevel-pinion, to gear with the pinion m, as shown in Fig. 4.

An extensible tumbling-shaft might be substituted for the sprocket-wheels and driving-band under some circumstances.

We are aware that reels have heretofore been driven by gearing instead of belts or chains, and do not broadly claim driving a reel by gearing; but

What we claim as our invention, and desire to secure by Letters Patent, is—

1. The combination, substantially as set forth, in a two-wheeled hinge-joint harvester, of an overhung reel, adjustable vertically on a single post mounted on the shoe, with a driving-shaft mounted on the reel-post and carrying a sliding pinion, for the purposes specified.

2. The combination, as set forth, with the reel and reel-post, of the clasp I, bracket $i^1$, pinion m, wheel M, and driving-shaft L', whereby the reel can be raised or lowered without deranging the gearing.

3. The combination, substantially as set forth, of the reel-shaft and its driving-shaft with tangentially-toothed gearing, for the purpose specified.

In testimony whereof we have hereunto subscribed our names.

AMOS RANK.
J. H. COX.

Witnesses:
 THOS. S. BAIRD,
 C. W. CADWALLADER.